Jan. 11, 1955
G. GORHAM
2,699,479
ADJUSTABLE CONTROL DEVICE
Filed March 29, 1950
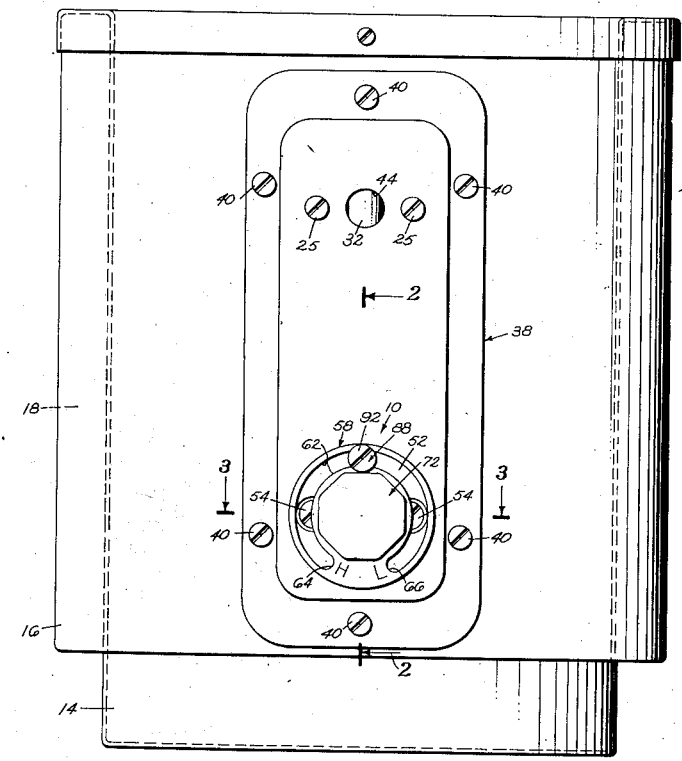
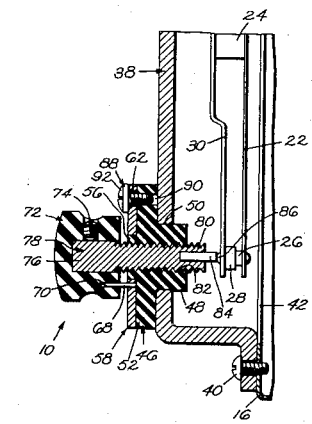
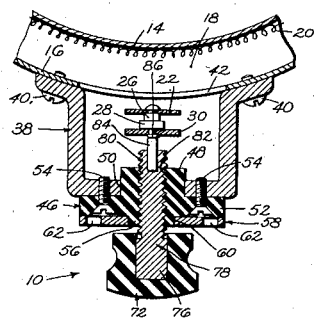
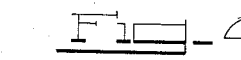
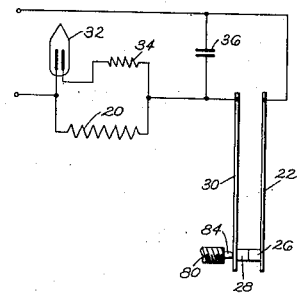
INVENTOR.
GEORGE GORHAM
ATTORNEYS

United States Patent Office

2,699,479
Patented Jan. 11, 1955

2,699,479
ADJUSTABLE CONTROL DEVICE

George Gorham, New York, N. Y., assignor, by mesne assignments, to Technicon International Ltd., New York, N. Y., a corporation of New York Application March 29, 1950, Serial No. 152,724

15 Claims. (Cl. 200—138)

The present invention relates to an adjustable control device.

It is usually desirable to provide means for variably adjusting a thermostat or other control devices for various purposes, so that the user may set the control device for response to a predetermined condition, according to his wishes. It frequently happens, however, that the user, who may be inexperienced or incompetent or impatient, sets the control device improperly, either deliberately or otherwise, so that the utility of the latter for its intended purpose is greatly impaired or even destroyed. For example, in the case of a paraffin bath for impregnating histologic tissue with paraffin, in the course of preparation of tissue sections for microscopic examination, an adjustable thermostat is provided to control the electric heater of the bath. The thermostat should be adjusted so that the melted paraffin is maintained at a predetermined required temperature which should not be exceeded beyond a permissive tolerance, if injury to the tissue is to be avoided, but for various reasons, such as those mentioned above, this is ignored or disregarded by the technician or his assistant and as a result of improper setting of the control, the paraffin is not maintained at the correct temperature or within the permissive temperature range. There are, of course, various other cases involving the misuse of control devices.

Therefore, the primary object of the present invention is the provision of an adjustable control device which may be preset, preferably at the factory, for a basic adjustment and which permits the user to make an individual limited adjustment within a permissive range to allow for various requirements or personal preferences.

Another object is the provision of a temperature control for a thermostat which may be preset for an optimum operating temperature, and which may be varied only within a limited range above and below said optimum temperature.

A further object is the provision of a generally improved control device which overcomes the above mentioned disadvantages of prior control devices.

The above and other objects, features and advantages of the present invention will be more fully understood from the following description considered in connection with the accompanying illustrative drawings.

In the drawings:

Fig. 1 is a view, in elevation, of a material heating mechanism embodying the adjustable control device of the present invention;

Fig. 2 is a sectional view taken on the line 2—2 of Fig. 1;

Fig. 3 is a sectional view taken on the line 3—3 of Fig. 1; and

Fig. 4 is a circuit diagram of the electrical components of the heating mechanism.

As the present invention was developed to obviate the disadvantages, in a device commonly known as a paraffin bath, resulting from the use therewith of a variable temperature control adjustment, the invention will be described herein in connection with the latter use. Referring now to the drawings in detail, the control device 10 of the present invention is shown mounted on a paraffin bath 12, which as here shown, comprises a cylindrical paraffin container 14 provided with an outer jacket 16 mounted thereon to provide a heating chamber 18 therebetween, in a manner well known in the art. Heating means, generally in the form of an electrically operated heating coil or element 20, illustrated diagrammatically in Figs. 3 and 4, is disposed in the chamber 18, and extends preferably around container 14 for heating the contents thereof. To maintain the heating temperature in the heating chamber at a constant pre-determined level, a bi-metallic flexible member or thermostat element 22 is provided in circuit with the heating coil. Thermostat element 22 is mounted in a suitable manner, on an insulator 24, held in position by screws 25. The free end of said element 22 is free to flex at a predetermined temperature, as is well understood. Element 22 is provided, at the free end thereof, with an electrical contact 26 which cooperates with a contact 28 carried at the free end of a resilient metal strip 30. The latter constitutes a pressure-flexible conducting member and is mounted, in a suitable manner, on insulator 24. Member 30 is in the circuit of heating coil 20 and thermostat 22, as illustrated in Fig. 4, when contacts 26 and 28 are engaged.

It will be understood that thermostat 22 heat-flexes in a direction away from member 30 to disengage contact 26 from contact 28 for opening the circuit at a predetermined temperature whereby heating coil 20 is de-energized. When the temperature has dropped sufficiently to cool thermostat 22, the latter assumes its original position wherein contact 26 re-engages contact 28 to complete the circuit through coil 20. It will be understood that the temperature required to flex member 22 sufficiently to disengage contact 26 from contact 28 may be varied by pressure-flexing member 30 to force contact 28 against contact 26 for pressure-flexing thermostat 22, in the circuit-closing position thereof, while said contacts are engaged. The greater the degree of pressure-flexing of the thermostat, in the engaged condition of said contacts, the higher is the temperature required to disengage said contacts when the thermostat is heat-flexed to the projected or circuit-opening position thereof.

A pilot light 32, here shown as a small neon lamp, is connected through resistor 34, both being in parallel with coil 20, to indicate the energized condition of the coil, said pilot light being energized when the circuit through the coil is complete, as is well understood. Capacitor 36 is connected between element 22 and member 30 to minimize sparking between contacts 26 and 28 when said element flexes to its projected or circuit-opening position, as is well understood.

Pursuant to the present invention, control device 10 is carried by, and extends through, housing 38 which is mounted on jacket 16, being secured thereto by screws 40. Housing 38 overlies an opening 42 provided in the jacket, said opening allowing for the flexing of the thermostat to its projected position. An aperture 44 is provided in the housing for observing pilot light 32.

Control device 10 is mounted in an insulated bushing 46 which is provided with a preferably circular portion 48, which extends through an aperture 50 formed in the housing, and with a flanged portion 52 which is secured to the outer surface of the housing by the counter-sunk screws 54 which retain the bushing against movement relative to the housing. Flange 52 is provided with a portion of reduced diameter, constituting a collar 56, which provides a bearing surface for a preferably circular metallic member 58 centrally apertured at 60 to fit on said collar, the inner surface of said member abutting flange 52. An arcuate slot 62, concentric with aperture 60, extends most of the way around member 58, adjacent the periphery thereof, between the detent portions 64 and 66, at each end, respectively, of said slot. A pin 68 projects from the outer surface of member 58, said pin being received in the recessed portion 70 of insulated knob 72. Said knob is releasably secured, as by set-screw 74, on the head 76 of the preferably metallic operating element or shaft 78 of control device 10. Said shaft is provided with a threaded shank 80 threadedly engaged in the tapped bore 82 formed in bushing 46. At its free end, shaft 78 is provided with an axially extending operating part 84 engageable with conducting member 30, preferably with a portion 86 of contact 28 which extends through the conducting member, as illustrated in Fig. 3. A screw 88 extends through slot 62 for threaded engagement in a tapped bore 90 formed in flange 52, the head 92 of said screw overlying the slot and adjacent portions of member 58 for releasably securing said member against rotation relative to the bushing and serving as a detent member, as hereinafter described. As here shown, member 58 is provided with the indicia H and L adjacent the detent portions 64 and 66, respectively, to indicate higher and lower temperatures, respectively. It will be noted that both the shaft 78 and the member 58 are insulated from the housing.

When the control device 10 is in assembled condition in the housing, as in Figs. 2 and 3, it is apparent that, due to pin 68, which interengages member 58 and knob 72, rotation of operating member 78 by the knob results in the concomitant rotation of said member on collar 56. It will be understood that rotation of knob 72 in a clockwise direction, viewing Fig. 1, causes movement of operating part 84 in a direction inwardly of housing 38 to urge conducting member 30 toward thermostat 22, contact 28 being urged against contact 26 to flex the thermostat whereby a higher temperature is required to move the thermostat to its projected position to disengage said contacts. Alternatively, rotation of knob 72 in a counterclockwise direction, viewing Fig. 1, results in the adjustment of the thermostat for disengagement of the contacts at a lower temperature.

Control device 10 is preferably preset at the factory for a preferred temperature at which the thermostat will disengage the contacts to de-energize the heating coil. This is accomplished by removing knob 72 from the shaft and by loosening screw 88 to release member 58. After the shaft is adjusted to the preferred setting thereof, member 58 is rotated so that screw 88 is intermediate the detent portions 64 and 66 of the slot. Screw 88 is then tightened to secure member 58 against rotation relative to flange 52. Knob 72 is then tightly secured on the shaft with pin 68 engaged in knob recess 70.

Thereafter, if the operator desires to change the temperature at which the contacts will disengage, screw 88 is loosened and the knob is rotated for concomitant rotation of shaft 78 and member 58. Rotating H toward screw 88 increases said temperature and rotating L toward said screw decreases said temperature. Rotation of the knob in either direction is limited by the fact that screw 88, serving as a detent, will abut either the detent portion 64, or the detent portion 66, of member 58, depending upon the direction of rotation. In the apparatus herein illustrated, the range of temperature adjustment was found to be plus and minus 5 degrees centigrade from the preset basic factory adjustment. After the adjustment is made, within the permitted range, screw 88 is tightened to prevent accidental rotation of the shaft. It will be apparent that the range of adjustment may be altered by changing the extent of slot 62.

From the foregoing description, it will be apparent that the control device of the present invention may be varied by the user only within a predetermined range, on either side of the basic adjustment thereof, whereby said invention is well adapted to perform the stated objects in a simple and efficient manner and the use thereof will result in increased efficiency and in increased life for the mechanism with which it is used.

While the invention has been illustrated and described in connection with a thermostat temperature control for a paraffin bath, it will be understood that it is not limited for use therewith but that it may be used with other types of mechanisms and to control other types of operating conditions, such as, for example, and not by way of limitation, pressure, tuning, light, etc.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In combination, a bi-metallic element, a pressure-flexible member, said element and said member being normally engaged at their free ends, respectively, said element flexing out of engagement with said member at a predetermined temperature, and control means for adjustably varying within a predetermined range the pressure of said member against said element whereby to vary said temperature, said control means comprising an operating member of fixed dimensions in engagement with said pressure-flexible member, a mounting member in which said operating member is mounted for axial movement upon rotation thereof to vary the pressure applied to said pressure-flexible member, a rotatable part carried by said mounting member and operatively connected to said operating member for concomitant rotation concentrically thereof, said part being provided with spaced detent portions, and detent means carried by said mounting member and disposed between said portions to be separately engaged by the latter for limiting the rotation of said part by said operating member whereby to limit the axial movement of said operating member.

2. In combination, a bi-metallic element, a pressure-flexible member, said element and said member being normally engaged at their free ends, respectively, said element flexing out of engagement with said member at a predetermined temperature, and control means for adjustably varying within a predetermined range the pressure of said member against said element whereby to vary said temperature, said control means comprising an operating member of fixed axial dimension in engagement with said pressure-flexible member, a mounting member in which said operating member is mounted for axial movement upon rotation thereof to vary the pressure applied to said pressure-flexible member, a rotatable part carried by said mounting member and operatively connected to said operating member for concomitant rotation concentrically thereof, said part being provided with an arcuate slot defined therein, and detent means carried by said mounting member and extending through said slot and separately engageable with the respective ends of said slot for limiting the rotation of said part by said operating member whereby to limit the axial movement of said operating member, said detent means being releasably engageable with said part for releasably retaining the latter in adjusted disposition thereof.

3. In apparatus having a bi-metallic element, and a pressure-flexible member, said element and said member being normally engaged at their free ends, respectively, said element flexing out of engagement with said member at a predetermined temperature; the combination with said pressure-flexible member of control means for adjustably varying within a predetermined range the pressure of said member against said element whereby to vary said temperature, said control means comprising an operating member of fixed axial dimension in engagement with said pressure-flexible member, a mounting member in which said operating member is mounted for axial movement upon rotation thereof to vary the pressure applied to said pressure-flexible member, a rotatable part carried by said mounting member and operatively connected to said operating member for concomitant rotation concentrically thereof, said part being provided with spaced detent portions, and detent means carried by said mounting member and disposed between said portions to be separately engaged by the latter for limiting the rotation of said part by said operating member whereby to limit the axial movement of said operating member.

4. In apparatus having a bi-metallic element, and a pressure-flexible member, said element and said member being normally engaged at their free ends, respectively, said element flexing out of engagement with said member at a predetermined temperature; the combination with said pressure-flexible member of control means for adjustably varying within a predetermined range the pressure of said member against said element whereby to vary said temperature, said control means comprising an operating member of fixed axial dimension in engagement with said pressure-flexible member, a mounting member in which said operating member is mounted for axial movement upon rotation thereof to vary the pressure applied to said pressure-flexible member, a rotatable part carried by said mounting member and operatively connected to said operating member for concomitant rotation concentrically thereof, said part being provided with an arcuate slot defined therein, and detent means carried by said mounting member and extending through said slot and separately engageable with the respective ends of said slot for limiting the rotation of said part by said operating member whereby to limit the axial movement of said operating member, said detent means being releasably engageable with said part for releasably retaining the latter in adjusted disposition thereof.

5. An adjustable control device, comprising a member mounted for adjusting movement, within one range of movement, to and from an adjusted position, means for releasably retaining said member in said adjusted position within said range, and means operable upon release of said retaining means and cooperating with the latter for limiting the adjustable movement of said member from said position to a different adjusted position but only within a range of movement less than said first mentioned range of movement.

6. An adjustable control device, comprising a rotary member mounted for adjusting movement, within one range of movement, to and from an axially adjusted position thereof, means for releasably retaining said member in said adjusted position within said range, and means operable upon release of said retaining means for limiting the adjustable movement of said member from said position to a different axially adjusted position thereof but only within a range of movement less than said first mentioned range of movement.

7. An adjustable control device, comprising a member mounted for adjusting movement, within one range of movement, to and from an adjusted position, means in operative engagement with said member for releasably retaining the latter in said adjusted position within said range, and means operable upon release of said retaining means for limiting the adjustable movement of said member from said position to a different adjusted position but only within a range of movement less than said first mentioned range of movement, said latter means including an additional member in operative engagement with said first mentioned member and mounted for concomitant movement therewith in opposite directions, and means for limiting said movement of said additional member.

8. An adjustable control device, comprising a rotary member mounted for adjusting movement, within one range of movement, to and from an axially adjusted position thereof, means in operative engagement with said rotary member for releasably retaining said member in said adjusted position within said range, and means operable upon release of said retaining means for limiting the adjustable movement of said member from said position to a different axially adjusted position thereof but only within a range of movement less than said first mentioned range of movement, said latter means including an additional rotary member in operative engagement with said first mentioned rotary member and mounted for concomitant rotary movement therewith in opposite directions, and means for limiting said movement of said additional member.

9. An adjustable control device, comprising a rotary member mounted for adjusting movement, within one range of movement, to and from an axially adjusted position thereof, means in operative engagement with said rotary member for releasably retaining said member in said adjusted position within said range, and means operable upon release of said retaining means for limiting the adjustable movement of said member from said position to a different axially adjusted position thereof but only within a range of movement less than said first mentioned range of movement, said latter means including an additional rotary member and mounted for concomitant rotary movement therewith in opposite directions, and means for limiting said movement of said additional member, said limiting means comprising a detent element and spaced stop means provded on said additional rotary member and engageable with said detent element.

10. An adjustable control device, comprising rotary shaft means mounted for adjusting movement, within one range of movement, to and from an axially adjusted position thereof, means in operative engagement with said shaft for releasably retaining the latter in said adjusted position within said range, and means operable upon release of said retaining means for limiting the adjustable movement of said shaft from said position to a different axially adjusted position thereof but only within a range of movement less than said first mentioned range of movement, said latter means including an additional rotary member mounted coaxially of said shaft and in operative engagement therewith for concomitant rotation therewith, detent means and spaced means provided on said additional rotary member and engageable with said detent means for limiting the movement of said additional rotary member.

11. An adjustable control device, comprising rotary shaft means mounted for adjusting movement, within one range of movement, to and from an axially adjusted position thereof, means in operative engagement with said shaft for releasably retaining the latter in said adjusted position within said range, and means operable upon release of said retaining means for limiting the adjustable movement of said shaft from said position to a different axially adjusted position thereof but only within a range of movement less than said first mentioned range of movement, said latter means including an additional rotary member mounted coaxially of said shaft and in operative engagement therewith for concomitant rotation therewith, said additional member having a closed arcuate slot defined therein, and a detent element extending into said slot and engageable with the ends thereof for limiting the movement of said additional rotary member.

12. Adjustable control mechanism comprising a housing, a mounting member carried thereby, a rotary shaft mounted in said member for adjusting movement within one range of movement to and from an axially adjusted position thereof, means in operative engagement with said shaft for releasably retaining the latter in said adjusted position within said range, said means including a retaining element adjustably carried by said member, and means operable upon adjustment of said retaining element for limiting the adjustable movement of said shaft from said position to a different axially adjusted position thereof but only within a range of movement less than said first mentioned range of movement, said latter means including an aidtional rotary member carried by said mounting member coaxially of said shaft and in operative engagement therewith for concomitant rotation therewith, and spaced means provided on said additional rotary member and engageable with said retaining element for limiting the movement of said additional rotary member.

13. In apparatus of the character described, an adjustable thermostatic control comprising a resiliently mounted contact and a companion temperature-responsive contact normally engaged therewith and adapted to disengage said resiliently mounted contact at a predetermined temperature to control the operating temperature of said apparatus, a control member of fixed dimensions adapted to engage said resiliently mounted contact to urge the latter against said companion contact, said member being mounted for adjusting movement, within one range of movement, to and from an adjusted position to preset said companion contact for a predetermined disengaging temperature within a first range of temperatures, means for releasably retaining said control member in said adjusted position within said one range of movement, and means operable upon release of said retaining means for adjustably moving said control member to a different adjusted position but only within a range of movement less than said first mentioned range of movement whereby to preset said companion contact to a different disengaging temperature which is within a temperature range that is less than and which falls within said first range of temperatures.

14. In apparatus of the character described, an adjustable thermostatic control comprising a resiliently mounted contact and a companion temperature-responsive contact normally engaged therewith and adapted to disengage said resiliently mounted contact at a predetermined temperature to control the operating temperature of said apparatus, a control member of fixed axial dimension adapted to engage said resiliently mounted contact to urge the latter against said companion contact, said control member comprising a rotary member mounted for adjusting movement, within one range of axial movement, to and from an axially adjusted position thereof to preset said companion contact for a predetermined disengaging temperature within a first range of temperatures, means in operative engagement with said rotary member for releasably retaining the latter in said adjusted position within said one range of movement, and means operable upon release of said retaining means for adjustably moving said control member from said position to a different adjusted position but only within a range of axial movement less than said first mentioned range of movement whereby to preset said companion contact to a different disengaging temperature which is within a temperature range that is less than and which falls within said first range of temperatures, said latter means including an additional rotary member in operative engagement with said first mentioned rotary member and mounted for concomitant rotary movement therewith in opposite directions, and means for limiting said movement of said additional member.

15. An adjustable control device, comprising a member mounted for adjusting movement, within one range of movement, to and from an axially adjusted position, and means for limiting the adjustable movement of said member from said position to a different axially adjusted position but only within a range of movement less than said first mentioned range of movement, said latter means including an additional rotary member in operative engagement with said first mentioned rotary member and mounted for concomitant rotary movement therewith in opposite directions, and means for limiting said movement of said additional member.

References Cited in the file of this patent

UNITED STATES PATENTS

| Number | Name | Date |
|---|---|---|
| 1,196,976 | Pembroke | Sept. 5, 1916 |
| 1,446,652 | Morris | Feb. 27, 1923 |
| 1,613,261 | Anthony | Jan. 4, 1927 |
| 1,778,770 | Patterson | Oct. 21, 1930 |
| 1,955,091 | Raney | Apr. 17, 1934 |
| 2,190,276 | Smith | Feb. 13, 1940 |
| 2,248,666 | Fischer | July 8, 1941 |
| 2,333,291 | Brannon | Nov. 2, 1943 |
| 2,345,997 | Anderson | Apr. 4, 1944 |
| 2,350,441 | Anderson | June 6, 1944 |
| 2,565,073 | Fuehring | Aug. 21, 1951 |

FOREIGN PATENTS

| Number | Country | Date |
|---|---|---|
| 397,250 | France | May 3, 1909 |